Oct. 28, 1952     W. G. RANSOM     2,615,536
BRAKE

Filed May 31, 1947     4 Sheets-Sheet 1

Inventor
Willard G. Ransom
By Fishburn & Mullendore
Attorneys

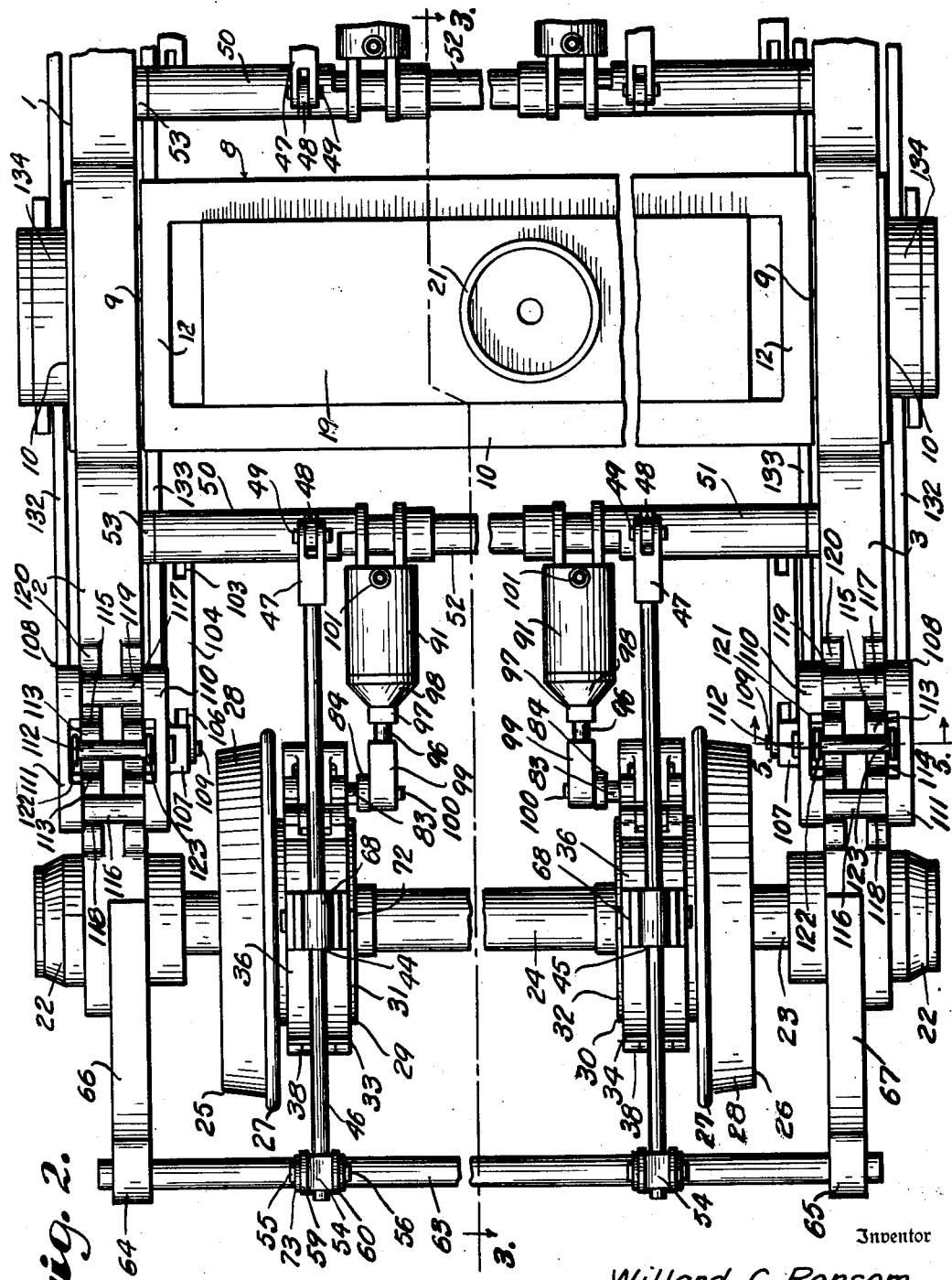

Oct. 28, 1952 W. G. RANSOM 2,615,536
BRAKE
Filed May 31, 1947 4 Sheets-Sheet 3
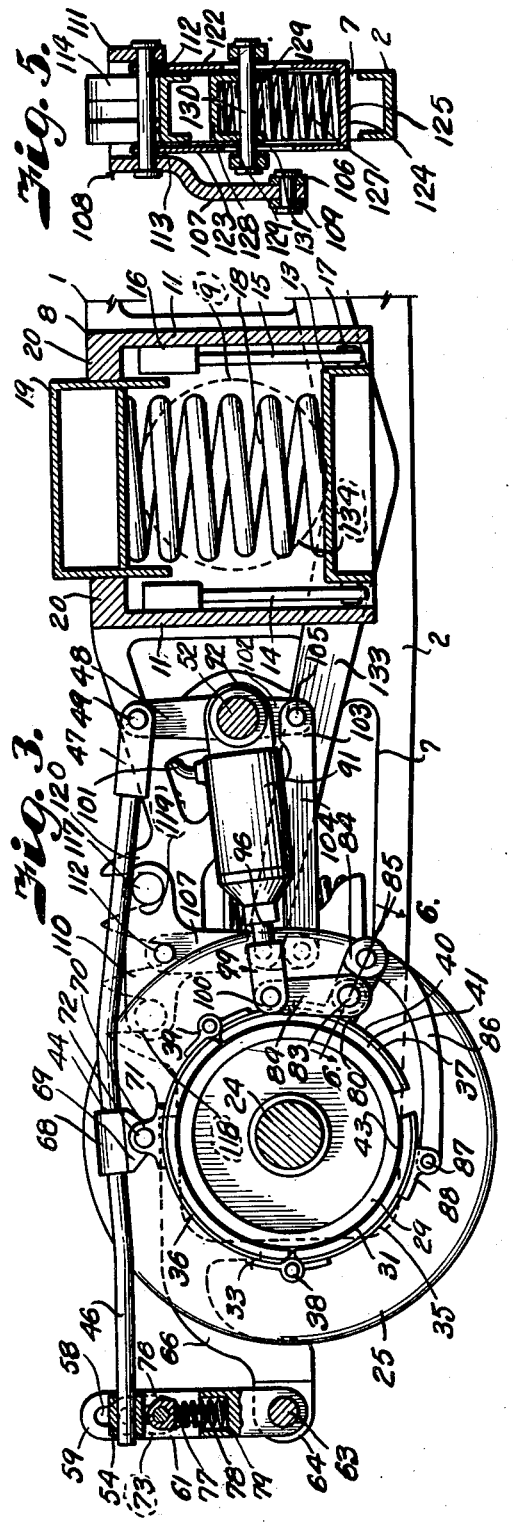
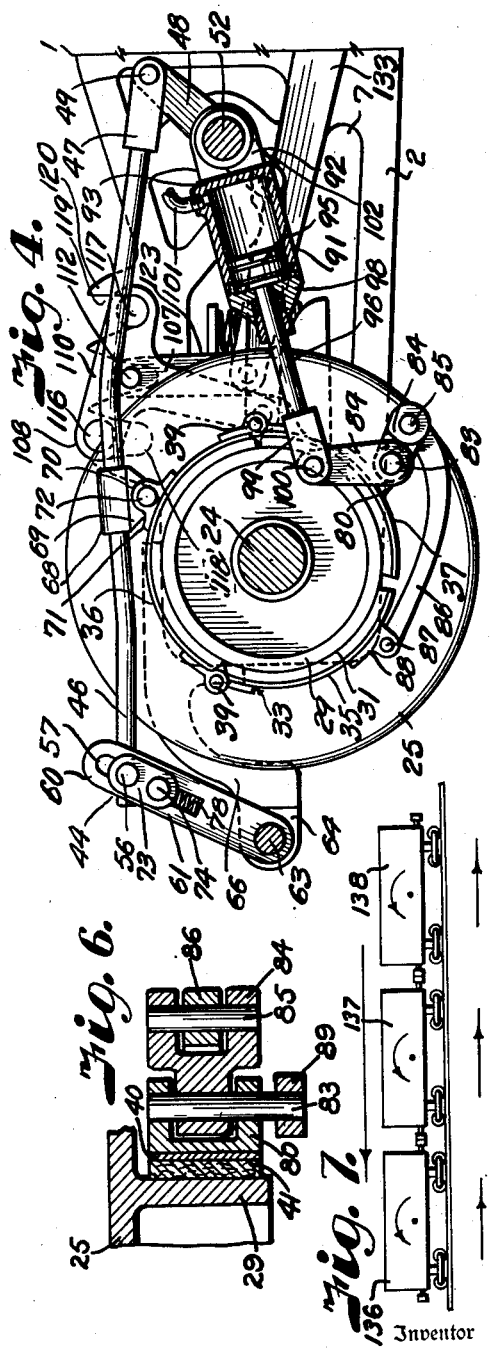
Inventor
Willard G. Ransom.
By Fishburn & Mullendore
Attorneys Oct. 28, 1952 W. G. RANSOM 2,615,536
BRAKE
Filed May 31, 1947 4 Sheets-Sheet 4

Inventor
Willard G. Ransom
By Fishburn & Mullendore
Attorneys

Patented Oct. 28, 1952

2,615,536

UNITED STATES PATENT OFFICE 2,615,536

BRAKE

Willard G. Ransom, Homewood, Kans.

Application May 31, 1947, Serial No. 751,587

12 Claims. (Cl. 188—195)

1

This invention relates to brakes for wheeled vehicles, for example, railway cars, which at times require application of retardation forces in excess of the usual service applications. Heretofore it has been the practice to provide such vehicles with brakes of sufficient power to produce emergency retardation but since adhesion between the wheels and the rails on which they travel, together with load carried on the respective wheels, determines maximum retardation that can be effected without sliding of the wheels, it is obvious that variable loading conditions acting on the respective wheels results in variable retarding action by the wheels and that the wheels bearing the lighter loads are apt to slide on the rails.

It is, therefore, the principal object of the present invention to provide a braking mechanism which results in substantially uniform effective retardation by the respective sets of axle connected wheels of a railway vehicle regardless of variable loading thereon or variable loading resulting from shifting of the load by inertia.

Another object of the invention is to provide a braking mechanism that is adapted to be influenced by the inertia effect of the center of gravity in differentially braked cars of a train to produce effective retardation of each pair of wheels proportional to the momentary effective load acting thereon when the brakes are applied.

Another object of the invention is to provide a braking mechanism capable of usual operation under ordinary service conditions.

It is another object to provide for controlling the effective braking action of the respective wheels of a car by the load carried thereon when the brakes are under emergency application so as to effect substantially uniform retarding effect of the wheels relatively to the rails and thereby obtaining optimum retardation of the car under emergency.

A further object of the invention is to provide means for controlling the effective brake force on each wheel axle unit utilizing the load carried thereon to act in overcoming tangential pull of the brakes.

A further object of the invention is to provide a braking mechanism controlled by the load on each wheel of a railway truck for applying braking forces to the wheels in direct ratio to a function of the load and the coefficient of adhesion between the wheels and rails.

In accomplishing these and other objects of the invention hereinafter pointed out, I have provided improved braking mechanism, a preferred form of which is illustrated in the accompanying drawings wherein:

Fig. 1 is a perspective view of one end of a railway truck equipped with a braking mechanism embodying the features of the present invention.

2

Fig. 2 is a plan view of the portion of the truck shown in Fig. 1.

Fig. 3 is a longitudinal section on the line 3—3 of Fig. 2 showing the brakes in released position.

Fig. 4 is a similar section showing the parts of the braking mechanism in the position of emergency application and the wheel rotating in a clockwise direction.

Fig. 5 is a detail section on the line 5—5 of Fig. 2.

Fig. 6 is a detail section through the brake shoe actuating levers on the line 6—6 of Fig. 3.

Fig. 7 is a diagrammatic view of a series of connected cars in a train and illustrating the action resulting in uniform retardation of the cars in a train when equipped with brakes embodying the features of the present invention.

Figure 1:
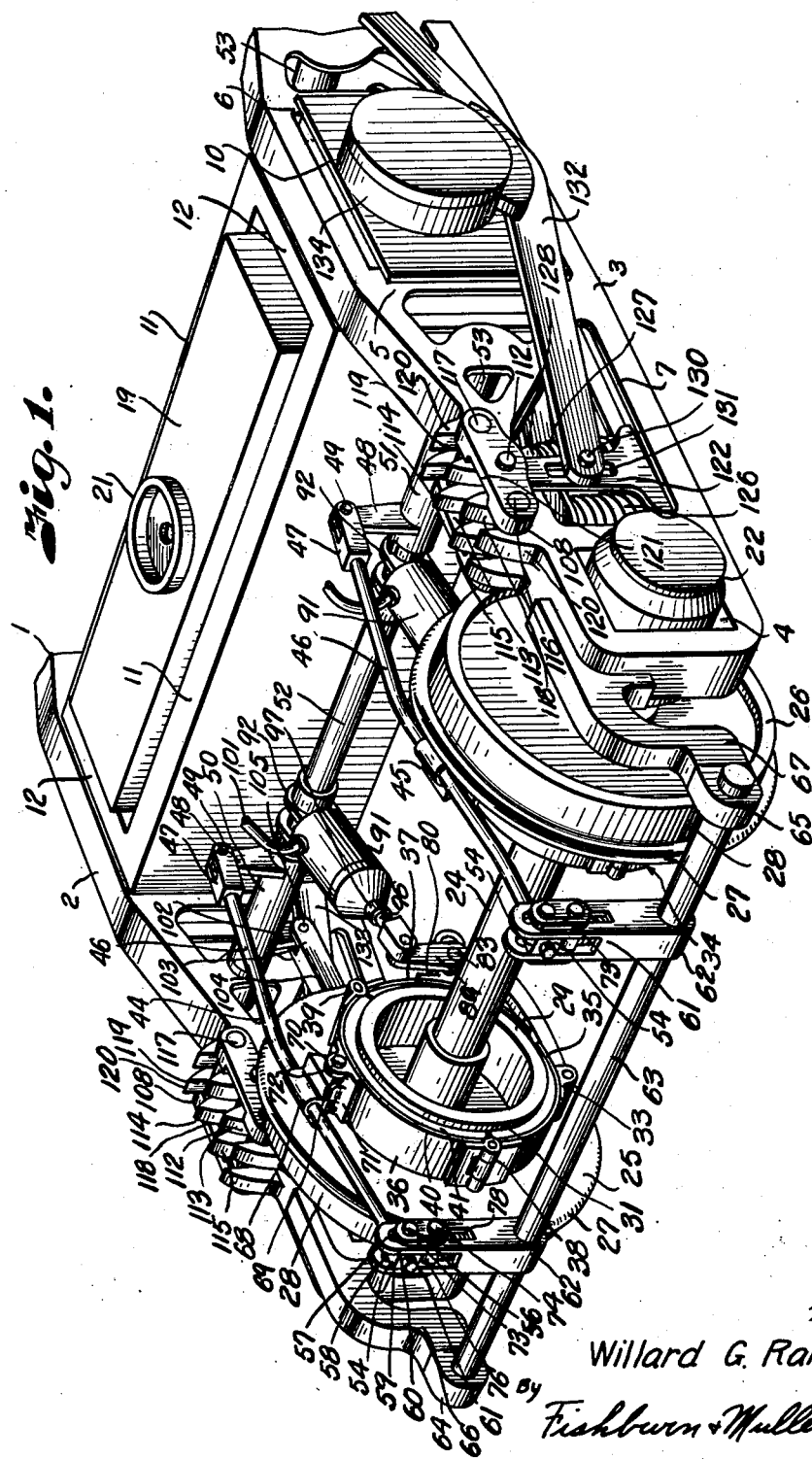

Referring more in detail to the drawings:

1 designates a truck for supporting one end of a railway vehicle and which includes side frames 2 and 3 provided at their ends with journal openings 4 and at the center with spaced vertical columns 5 and 6. The intermediate portions of the frames are cut away as at 7 to lighten the structure and accommodate various lever mechanisms later described. Extending transversely between the side frames is a box-like girder 8 having trunnions 9 at the respective ends thereof carrying trunnion boxes 10 that are vertically slidable between the columns 5 and 6, the trunnions permitting the girder to rock and the frame members to have independent rocking movement to compensate for variations in level of the rails on which the truck is supported. The box-like girder 8 includes spaced side members 11 connected at the ends by cross members 12 to form a well or enclosure in which a spring seating member 13 is suspended by pairs of links 14 and 15. The upper ends of the links are suitable attached to the inner faces of the side members as indicated at 16 and the lower ends are pivotally connected with studs 17 that project from the sides of the spring seat 13.

Carried on the spring seat 13 are springs 18 that support a center bearing bolster 19. The bolster 19 is guided between inturned flanges 20 on the side members of the box-like girder when the springs 18 compress under weight of the vehicle body. The center of the bolster 19 mounts a center bearing 21 on which the body of the car is supported and which permits turning of the truck relatively to the car body as when the railway vehicle is rounding a curve in the track.

Suitably mounted within the journal openings 4 at each end of the side frames are axle journals 22 mounting wheel-axle units 23 comprising axles 24 to which are fixed wheels 25 and 26 having the customary flanges 27 and rail engaging faces 28. Fixed to the respective wheels and projecting laterally from the flange sides thereof are brake drums 29 and 30 having circumferential brake engaging faces 31 and 32 substantially encircled by brake assemblies 33 and 34.

Each brake assembly includes a plurality of arcuate segments or shoes 35, 36 and 37 arranged in end to end relation and in circumferential series with the end segments 35 and 37 hinged to the ends of the segment 36 by hinge connections 38 and 39. Each segment or shoe preferably includes an arcuate braking member 40 having a lining 41 forming a braking face 42 for engaging the braking faces of the respective drums when the brake elements are contracted about the drums as later described to apply braking forces on the respective wheels. The brake shoes are normally retained out of contact with the braking faces of the drums to provide a working clearance 43 by means of supports 44 and 45.

Each brake support includes a rod or the like 46 that extends in the lengthwise direction of the truck above each of the brake drums as best shown in Figs. 1 and 3. The inner ends of the rods 46 have yoke-shaped heads 47 that are pivotally connected with arms 48 by pins 49, the arms for each support 44 and 45 being fixed to sleeves 50 and 51 loosely mounted on transverse shafts 52 that extend transversely of the truck on the respective sides of the box-like bolster as best shown in Fig. 2. The ends of the shafts 52 are suitably supported in bearings 53 carried by the side frames. The outer ends of the rods 46 are fixed to blocks 54 having laterally extending trunnions 55 and 56 that project through slot-like openings 57 and 58 in the sides 59 and 60 of the yoke-shaped ends 61 of rocker arms 62. The rocker arms 62 are pivotally supported at their lower ends on cross shafts 63 which extend transversely of the ends of the truck. The ends of the shafts 63 are mounted in bearings 64 and 65 journalled in brackets 66 and 67 and are attached to the respective side frames and project in the longitudinal direction of the truck as best shown in Fig. 1.

Fixed on each supporting rod 46 is a bracket 68 having depending ears 69 engaging between upstanding ears 70 on a bracket 71 attached to the intermediate segment 36 of each brake shoe assembly as shown in Figs. 1 and 3. The blocks 54 mounted on the outer ends of the supporting rods are carried on links 73 mounted on the trunnions 55 and 56. The lower ends pivotally connect with similar trunnions 74 on heads 76 that are mounted between the sides 59 and 60 of the yokes 61 and which have depending shanks 77 sleeved within the upper ends of coil springs 78, the springs being seated in sockets 79 of the rocker arms 62 with their upper ends bearing against the heads 76 to yieldingly support the outer ends of the rods. The outer ends of the rods 46 are thus mounted so that the rods pivot on the arms 48 to yieldingly support the shoes 36 out of contact with the brake drum while the shoes 35 and 37 swing outwardly away from the drums by reason of their pivotal connections 38 and 39 with the shoes 36. The wheels are thus free to turn and are relieved of any drag of the brake assemblies when the brakes are in released position as shown in Fig. 3.

Fixed to the brake shoe 37 of each assembly is a bracket 80 having radially extending laterally spaced ears 81 and 82 and journalled therein is a shaft 83 carrying a radially projecting arm 84 that is fixed to the shaft. The outer end of each arm 84 is connected by pins 85 with a toggle link 86 which has its opposite end connected by a pin 87 with a bracket 88 on the shoe 35. Fixed to the inner end of each shaft 83 is a rocker arm 89 that is adapted to be actuated by brake cylinder mechanism now to be described.

Each wheel has a separate brake actuator which includes a cylinder 91 having ears 92 projecting from a closed end 93 thereof. The ears of the cylinders are pivotally mounted on the shafts 52 as shown in Fig. 2 so that the other ends of the cylinders extend in the direction of a related brake assembly. Slidably mounted in each cylinder 91 is a piston 95 to which is connected a rod 96 reciprocable in a stuffing box 97 carried by the head 98 of the cylinder. The outer ends of the piston rods are provided with yokes 99 that are pivoted to the arms 89 by pins 100. Fluid pressure actuating medium is admitted to the respective cylinders through ducts 101 that are connected with the customary valve controls on the car (not shown).

It is thus obvious that when air is admitted to the rear ends of the cylinders for service operations the pistons are pushed forwardly therein to move the lever arms 89 in the direction of the brake drums (Fig. 3) to rock the shafts 83 which raises the arms 84 so that they exert a pull on the links 86 which contracts the shoes about the brake drums. During this movement of the brake shoes, the shoe supporting rods 46 rock upon the pins 49 against action of the springs 78 to permit engagement of the shoes 36 with the drum. When the brake shoes are applied, that is, when that are engaged with the braking drum, the rotating force of the wheels tends to carry the brake shoes therewith. However, rotation of the brakes with the wheels is normally prevented by the brake supports and the brakes are effective in retarding wheel rotation whenever the brake actuators are operated but there remains a tangential pull by the brakes on their supporting means.

When full emergency applications are made the efficiency of the brakes is dependent upon coefficient of adhesion between the wheels and rails. Consequently, under emergency application the lightly loaded wheels and those having limited adhesion with the rails will slide with the result that the sliding wheels reduce the effectiveness of the retardation.

To overcome this difficulty the present invention contemplates a mechanism for controlling breaking forces in emergency proportional to the combined effects of the static and inertia load forces so as to obtain an optimum retarding effect on each wheel-axle unit. This is effected by connecting the brake supporting means with the load carried on the respective wheels for counteracting or balancing the tangential pull of the brake shoes acting at and during the time that the brakes are applied as now to be described.

Fixed to the respective sleeves 50 and 51 are arms 102 that are connected with yoke-shaped ends 103 of links 104 by means of pivot pins 105. The links extend along the inner sides of the frames and have yokes 106 on their opposite ends that connect with arms 107 of fulcrum levers 108 by pins 109. Each lever 108 includes a cross head 110 that cooperates with a link 111 to carry a cross shaft 112 that extends transversely of the side frame and which is adapted to engage in a seat 113. The seat 113 is formed across the upper edge of the side frame between upstanding lugs 114 and 115. The cross head and link are connected at their respective ends and on opposite sides of the shaft 112 with fulcrum pins 116 and 117 that engage in notch-shaped seats 118 and 119 that are formed between upstanding lugs 120 and the lugs 114 and 115. The head 110 and the link 111 are notched on their facing sides as at 121 to accommodate arms 122 and 123 of a yoke 124 having the bar portion 125 thereof extending through the openings 7 of the side frame, while the arms 122 and 123 depend on the respective sides of the frame. The cross bar portion 121 of the yoke is of sufficient length in the longitudinal direction of the truck to form seats for mounting coil springs 126 and 127 on the respective sides of the vertical center lines of the arms of the yoke as best shown in Fig. 1. The upper ends of the springs mount a plate 128 having depending ears 129 located in registry with the arms of the yoke. The ears 129 carry a cross pin 130 having ends thereof projecting through slots 131 in the yoke arms.

Mounted on the outer ends of the cross pins of the fulcruming mechanisms of the same side of the truck are interconnected by links 132 and 133 extending along the inner and outer faces of the side frames as best shown in Figs. 1 and 2 so that the central portions of the links form a seat engaging under the bosses 134 of the bearing blocks 10.

Assuming that an emergency application of the brakes is made, the pistons 95 are forced to the ends of the cylinders to effect maximum projection of the piston rods and rocking movement of the lever arms 89 to their limit which will force the shoes 37 against the drums and at the same time rock the levers 84 to draw the shoes 36 and 35 in contact with the drums so as to exert maximum gripping action of the brake shoes on the drums. When the brake shoes are thus engaged the tangential pull causes them to tend to rotate with the drum and the brake cylinder assemblies to rock on the shafts 52 in an upwardly or downwardly direction depending upon the direction of rotation of the wheels and the position of the cylinders relatively to the wheels of the truck, that is, the ends of the truck are symmetrical. Therefore the brake cylinder controlling the wheels at one end of the truck will swing downwardly as shown in Fig. 4 while the brake cylinder for the other wheels will swing upwardly when the brakes are applied.

Figure 8:
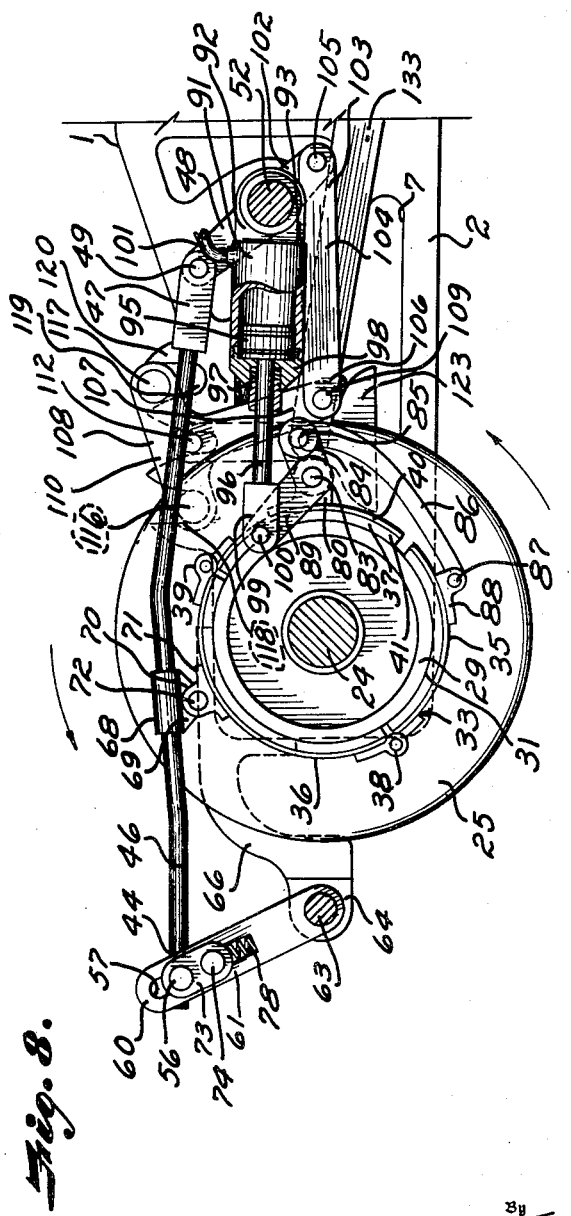
Fig. 8 is a view similar to Fig. 4 but showing the brake parts in the position they assume when the wheel is rotating in an anticlockwise direction.

Assuming that the wheels are rotating in a clockwise direction shown in Fig. 4, the movement of the cylinder for the rear set of wheels is downwardly and the connections 68 with the supporting rods 46 will effect shifting of the supporting rods in the direction of movement of the truck. Shifting of the supporting rods 46 rocks the sleeves 50 and 51 through the arms 48 and the arms 102 on the sleeves will move rearwardly with respect to the direction of movement of the truck to rock the fulcrum levers 108 through the links 104 so that the fulcrum levers pivot on the pins 117 (Figs. 3 and 4) to raise the cross shafts 112 from their seats which movement lifts the yokes 124 and through the springs 127 lifts the members 128 that carry the pins 130. The pins 130 are, therefore, raised to exert a lift on the bearing boxes 134 that carry the center bolster, which carries the load on the truck. Resistance to movement of the bolster under load on the truck controls the extent of movement of the supporting rods 46 under tangential pull of the shoes and thereby control the effect of the leverage exerted by the lever mechanism which connects the power cylinders with the brake mechanism. That is the arms 84 are moved reversely to release the contracting pressure applied by the toggle links 86 to prevent sliding of the wheels. The movement of the cylinder for the front set of wheels is upwardly when the brakes are set but the results are the same. Fig. 8 shows the brake mechanism in position after emergency application of the brakes with the wheel rotating in the opposite direction to the direction of wheel rotation in Fig. 4. After setting of the brakes, the shoes tend to rotate with the wheel in an anticlockwise direction to lift the load. This is effected because the drag pulls the rod 46 in the direction of truck movement and rocks the lever 48 to rock the cross head 110 in the opposite direction to lift the cross shaft 112. This lifting movement is resisted by the load and the extent of movement is under control of the load. Since the piston has reached the end of its stroke the position of the pin 49 becomes substantially fixed and controls the position of the lever 89. Then the load takes over control and regulates the pressure of the shoes on the wheel. This is because lift of the load allows the shoes to move forward which results in changing the relative position of the rocker arm 89 and reduces pressure of the shoes on the wheel until the lifting movement has stopped.

Consequently, since each wheel-axle unit of the truck is provided with separate braking mechanisms and corresponding control mechanisms the optimum braking effect on each wheel-axle unit, after emergency operation, is proportional to the load carried on the bolster of the truck and since the load controls the effective braking action of the wheels, optimum retardation is effected by each wheel regardless of variable loading on the bolsters. It is also obvious that any shifting of the load from one wheel-axle unit to another by reason of inertia or centrifugal force at the time the brakes are applied, results in readjustment of the braking forces on the respective wheels. On emergency actuation of the brakes, that is when the pistons of the brake cylinders are fully extended, it is obvious that the braking forces on the respective wheels become responsive to the load acting on the respective bolsters, and the braking effect is reduced to avoid sliding of the wheels. The rods 46 through their connection with the brake shoes at 72 form adjustable stops for the brake shoes under tangential pull thereof on the brake drums. This movement of the rods due to the link and lever connection with the spring supported bolsters act against the load through the fulcrum levers so that if the pressure acting on the rods is sufficient to lift the load, the stops move sufficiently to shift the toggle mechanism with respect to the then fixed pivots 100 so that the yielding movement of the brake shoes respond to lifting of the load to release the brake drums sufficiently to avoid sliding of the wheels.

The invention not only provides optimum and substantially uniform retardation by each wheel-axle unit of a single car but a train of cars equipped with the braking mechanism tends to obtain uniform retardation of all of the cars in the train, for example, in the diagrammatic drawing illustrated in Fig. 7, a train of three railway cars 136, 137 and 138 is illustrated, it being assumed that the two endmost cars 136 and 138 have normally twenty per cent retardation and the intermediate car 137 fifteen per cent retardation by reason in their basic design.

The inertia of the load carried in the cars result in transfer of the load to the front trucks which permits greater retardation of the front wheels without sliding, but the inertia effects of the succeeding car tend to increase the load on the rear trucks which permits greater braking action on the wheels of the rear trucks of a preceding car.

What I claim and desire to secure by Letters Patent is:

1. In a railway truck, a frame and wheels supporting the frame, a load carrying bolster, resilient means for carrying the bolster on the frame, a brake mechanism for each wheel, means for raising the bolster including a fulcrum member associated with each wheel and having spaced fulcrums for pivoting said members on the frame depending upon the direction that the fulcrum members are rocked, means connecting the fulcrum members at respective sides of the truck and having lifting connection with ends of the bolster to lift the bolster upon rocking of the fulcrum levers on one of their fulcrums, an actuator for each braking mechanism to engage the braking mechanisms for retarding rotation of the wheels, and means responsive to tangential pull of the brake mechanisms for rocking the fulcrum members in opposition to the load on said bolster to overcome said tangential pull proportional to said load carried on the bolster for regulating the retarding effect of said brake mechanisms independently of said actuators.

2. In combination with a railway truck having axles and wheels fixed to the axles, a brake mechanism including a rotary element associated with each wheel, a braking element for frictionally engaging each rotary element to retard movement of the truck, separate means for supporting the respective braking elements out of contact with the rotary elements and adapted to move under tangential pull of the braking elements when the braking elements are engaged with the rotary elements, a separate actuator for each braking element, lever mechanisms connecting the actuators with the braking elements and adapted to shift with the braking elements when the braking elements are engaged with the rotary elements to change the brake pressure exerted by the lever mechanisms on the braking elements independently of the actuators, and means responsive to load carried by the truck for and having connection with the brake element supporting means for resisting movement of said supporting means with the rotary elements to control the brake pressure that can be exerted by said lever mechanisms.

3. In combination with a railway truck having front and rear axles and wheels on the axles, a brake mechanism including a rotary element rotatable with each wheel and having spaced apart ends, braking means substantially encircling the rotary elements, independent actuators for each braking means, toggle means interconnecting said spaced apart ends of each braking means, a lever connected with the toggle in the means for actuating the toggle means for contracting the braking means about said rotary elements, the effective leverage of said lever and toggle mechanism being adapted to change when the braking means tend to rotate with the rotary elements, a separate supporting means for each braking means and having movable support on the truck for limiting rotative movement of the braking means with the rotary elements for varying the effective leverages of said lever mechanisms on the braking means, and means responsive to the load carried by the truck for limiting movement of the supporting means to control the effective leverage of said lever mechanisms proportional to the load carried by the truck.

4. In combination with a railway truck having front and rear axles and wheels on the axles, a brake mechanism including a drum rotatable with each wheel, articulated brake means encircling the drums, independent actuators for each brake means including a cylinder and a piston slidable in the cylinder, means for pivoting the cylinders on the truck, rods connected with the pistons, a toggle mechanism for actuating the brake means, a lever interposed between piston rods and the toggle mechanism for actuating the toggle mechanism for contracting the brake means about said drums and to provide anchors for the toggle mechanism when pistons are fully extending in the cylinders and the brake means are engaged with the drums for changing the effective leverage of said toggle mechanisms, and means responsive to the load carried by the truck for limiting rotative movement of the brake means to control the effective leverage of said lever mechanisms on said brake means proportional to the load carried by the truck.

5. In combination with a railway truck including a frame, a load carrying bolster extending transversely of the frame, transverse axles journalled on the frame at the front and rear of the bolster, wheels on said axles, a brake mechanism for each wheel including a drum fixed to rotate with an associated wheel, a plurality of brake shoes arranged in end to end relation to form a circumferential series about each drum, means pivotally interconnecting the brake shoes in said end to end relation with the exception of two immediately adjacent shoes in said series to provide interconnected intermediate brake shoes and spaced apart end shoes at the ends of said series, transverse shafts at the front and rear of each axle, arms pivotally supported on the shafts at the front and rear of each drum, supports pivotally connecting said arms and having yieldable support relatively to one of the arms, means connecting the supports to one of the intermediate shoes, a separate actuator for each brake mechanism, a lever mechanism connecting the actuators and said spaced apart ends shoes to tighten the shoes about the drums when the actuators are operated, said shoes being movable in the rotative direction of the drums for changing the effective leverage exerted by the lever mechanisms after full operation of the actuators, a fulcrum lever related to each brake mechanism and having pivotal support on the frame, means connecting each fulcrum lever to its support, and means connecting the bolster with the fulcrum levers to utilize the load on the bolster in limiting rotary movement of the brake shoes with their drums for adjusting the effective retardation of the wheels responsive to load carried by the bolster.

6. In a railway truck including spaced side frames, a load carrying bolster extending transversely between the side frames, trunnion boxes vertically slidable in the side frame, trunnions on the ends of the bolster and mounted in the trunnion boxes, transverse axles journalled on the frame at the front and rear of the bolster, wheels on said axles, a brake mechanism for each wheel including a drum fixed to rotate with its associated wheel, a plurality of brake shoes for each drum, means pivotally interconnecting the brake shoes of each drum in a circumferential series with the exception of two adjacent brake shoes in each series, transverse shafts at the front and rear of each axle, pairs of arms pivotally supported on the shafts to the front and rear of each drum, rod-like supports pivotally connecting the arms of each pair of arms and having yieldable support relatively to one of the arms, means connecting the rod-like supports to the interconnected shoes, a separate actuator for each braking means and having pivotal support on one of said shafts, a lever mechanism connecting the actuators with said interconnected brake shoes, a fulcrum lever associated with each wheel and having pivotal support on the frame adjacent its associated wheel, means connecting each fulcrum lever with its related supporting arm to control movement of said arm responsive to movement of the fulcrum lever, and links connecting the fulcrum levers on the same side frames and extending in lifting relation with the trunnion boxes to lift the load on said bolster when the fulcrum levers are actuated responsive to tangential pull of the shoes on the rod-like supports, whereby the load limits the effective force of the brake shoes.

7. In combination with a railway truck including spaced side frames, a load carrying bolster extending transversely of the frame, transverse axles journalled on the frame at the front and rear of the bolster, wheels on said axles, a brake mechanism for each wheel and a separate actuator for each brake mechanism, of means for controlling the pressure applied by the brake mechanisms independently of the actuators including spaced fulcrum seats on the side frames at opposite sides of the bolster, fulcrum levers having spaced fulcrums for engaging in the spaced seats and having depending yokes, springs seated on said yokes, means carried on the springs and having pins extending through slots in the yokes, means interconnecting the pins carried by fulcrum levers on the same side frames and having lifting connections with ends of the bolster, means connecting the fulcrum levers with the brake mechanisms, and means responsive to tangential pull of the brake mechanisms for actuating the fulcrum levers on one of their fulcrums depending upon the direction in which the truck is moving at the time the brake mechanisms are actuated.

8. In a railway truck including a frame having side frames provided with spaced central columns, trunnion boxes slidable between the columns, a load carrying bolster extending transversely of the frame, trunnions on the end of the bolster and supported in the trunnion boxes, a spring support suspended within the bolster, springs carried on the spring support, a center bolster carried on the springs for mounting a vehicle body on said truck, transverse axles journalled on the frame at the front and rear of the bolster, wheels on said axles, a brake mechanism for each wheel, a separate actuator for each brake mechanism, and means responsive to tangential pull of the brake mechanisms for lifting the bolster by said tangential pull independently of the actuators.

9. In a railway truck having front and rear axle connected wheels, braking means adapted to retard rotation of said wheels, actuators connected with the braking means and having full extent of movement under an emergency application, means for supporting the braking means for limited rotational movement after completion of said movement of the actuator to vary the retarding effect of said braking means independently of the actuator, and means for controlling the movement responsive to the loads carried on said front and rear wheels respectively for maintaining the retarding effect on said wheels proportional to said loads.

10. In a railway truck having front and rear axle connected wheels, braking members rotatable with the front and rear wheels, braking means adapted to frictionally engage the braking members, actuators connected with the braking means for effecting frictional engagement with the braking members, means for supporting the braking means for limited rotational movement with the braking members to vary the retarding effect of said braking means independently of control of the actuators when the braking means engage the braking members, and means for controlling said movement responsive to the loads carried on said front and rear wheels respectively for maintaining the retarding effect on said wheels proportional to said loads.

11. In a railway truck including axle connected wheels, braking means for frictionally engaging each of the wheels and having limited rotational movement when engaged with the wheels, means for controlling rotational movement of said braking means responsive to the load carried on the respective wheels, an actuator connected with the respective brake means for effecting engagement of said brake means with said wheels, and means for varying the retarding effect of said brake means responsive to rotative movement of said braking means whereby the retardation of the axle connected wheels is in direct ratio to a function of weight on the respective wheels and coefficient of friction between the wheels and surface on which they operate.

12. In a railway truck including axle connected wheels, a brake member rotatable with the wheels, an actuator, a leverage connection between the actuator and the brake member for setting the brake member upon operation of the actuator, said leverage connection being operable by movement of the brake member to reduce pressure on the brake member by said actuator responsive to tangential pull on the brake member by said wheels, means supporting the brake member on the truck for movement by said tangential pull, load lifting means on the truck, means connecting the load lifting means with said support to limit movement of the support responsive to the load on the truck for controlling pressure of the brake member independently of control of the actuator.

WILLARD G. RANSOM.

REFERENCES CITED

The following references are of record in the file of this patent:

UNITED STATES PATENTS

| Number | Name | Date |
|---|---|---|
| 1,016,289 | Ransom | Feb. 6, 1912 |
| 1,102,175 | Stegg | June 30, 1914 |
| 1,437,852 | Laughlin | Dec. 5, 1922 |
| 1,526,442 | Stiegelmeyer | Feb. 17, 1925 |
| 2,250,725 | Ransom | July 25, 1941 |